US007351961B2

(12) United States Patent
Malek et al.

(10) Patent No.: US 7,351,961 B2
(45) Date of Patent: Apr. 1, 2008

(54) MEASURING CELL FOR ION CYCLOTRON RESONANCE SPECTROMETER

(75) Inventors: Robert Malek, Lilienthal (DE); Frank Czemper, Bremen (DE)

(73) Assignee: Thermo Finnigan LLC, San Jose, CA (US)

(*) Notice: Subject to any disclaimer, the term of this patent is extended or adjusted under 35 U.S.C. 154(b) by 207 days.

(21) Appl. No.: 10/573,194

(22) PCT Filed: Sep. 24, 2004

(86) PCT No.: PCT/EP2004/010839

§ 371 (c)(1),
(2), (4) Date: Mar. 21, 2006

(87) PCT Pub. No.: WO2005/031792

PCT Pub. Date: Apr. 7, 2005

(65) Prior Publication Data

US 2007/0040114 A1 Feb. 22, 2007

(30) Foreign Application Priority Data

Sep. 25, 2003 (GB) ................................ 0322483.9

(51) Int. Cl.
*B01D 59/44* (2006.01)

(52) U.S. Cl. ...................... 250/291; 250/281; 250/282; 250/290; 250/297

(58) Field of Classification Search ................ 250/281, 250/282, 283, 290, 291, 297
See application file for complete search history.

(56) References Cited

U.S. PATENT DOCUMENTS 4,581,533 A 4/1986 Littlejohn et al.
5,019,706 A * 5/1991 Allemann et al. .......... 250/291
6,784,421 B2 * 8/2004 Park ........................... 250/281

OTHER PUBLICATIONS

Vartanian, et al ("High Performance Fourier Transform Ion Cyclotron Resonance Mass Spectrometry Via a Single Trap Electrode" J. Am. Soc. Mass Spectrom, Elsevier Science Inc. (U.S.) vol. 6 (No. 9) p. 812-821, Sep. 1, 1995).*

Nikolaev et al., "Analysis of Harmonics for an Elongated FTMS Cell with Multiple Electrode Detection," Int'l J. of Mass Spectrom and Ion Process, Elsevier Scientific Publ. Co. (Amsterdam, NL), p. 215-232, (Dec. 20, 1996).

Beu et al., "Open Trapped Ion Cell Geometries for Fourier Transform Ion Cyclotron Resonance Mass Spectrometry," Int'l J. of Mass Spectrom. and Ion Processes, Elsevier Scientific Publ. Co. (Amsterdam, NL), p. 215-230, (Jan. 12, 1992).

(Continued)

*Primary Examiner*—Robert Kim
*Assistant Examiner*—Michael Maskell
(74) *Attorney, Agent, or Firm*—Charles B. Katz

(57) ABSTRACT

This invention relates to a measuring cell for an Ion Cyclotron Resonance (ICR) spectrometer. The present invention provides a measurement cell for an FTMS spectrometer, comprising an excitation electrode arrangement positioned about a longitudinal axis which extends in a direction generally parallel to the field direction of an applied homogeneous magnetic field; and a trapping electrode arrangement, also positioned about the said longitudinal axis, for trapping ions longitudinally in the cell within a trapping region defined by the trapping electrode arrangement; wherein at least a part of the excitation electrode arrangement extends axially outwardly of the trapping region defined by the trapping electrode arrangement.

34 Claims, 6 Drawing Sheets

OTHER PUBLICATIONS

Shenheng et al., "Ion Traps for Fourier Transform Ion Cyclotron Resonance Mass Spectrometry: Principles and Design of Geometric and Electric Configurations," Int'l J. Mass Spectrom and Ion Processes, Elsevier Scientific Publ. Co. (Amsterdam, NL), p. 261-296, (Aug. 31, 1995).

Vartanian et al., "High Performance Fourier Transform Ion Cyclotron Resonance Mass Spectrometry via a Single Trap Electrode," J. Am. Soc. Mass Spectrom., Elsevier Science Inc. (U.S.), vol. 6 (No. 9), p. 812-821, (Sep. 1, 1995).

* cited by examiner

MEASURING CELL FOR ION CYCLOTRON RESONANCE SPECTROMETER

This invention relates to a measuring cell for an Ion Cyclotron Resonance (ICR) spectrometer.

Fourier Transform Ion Cyclotron Resonance is a technique for high resolution mass spectrometry which employs a cyclotron principle.

One such FT-ICR spectrometer is shown in our co-pending Application No. GB 0305420.2 which is incorporated herein by reference in its entirety. As is described in that application, ions generated in an ion source (usually at atmospheric pressure) are transmitted through a system of ion optics employing differential pumping and into an ion trap. Ions are ejected from the trap, through various ion guides and into a measurement cell. In that cell, the field lines of a homogeneous magnetic field (generated by an external superconducting magnet, for example), extend along the cell in parallel with the cell's longitudinal axis. By applying an r.f. field, perpendicular to the magnetic field, the ions can be excited so as to produce cyclotron resonance. Charged particles in the cell then orbit as coherent bunches along the same radial paths but at different frequencies. The frequency of the circular motion (the cyclotron frequency) is proportional to the ion mass. A set of detector electrodes are provided and an image current is induced in these by the coherent orbiting ions. The amplitude and frequency of the detected signal are indicative of the quantity and mass of the ions. A mass spectrum is obtainable by carrying out a Fourier Transform of the 'transient', i.e. the signal produced at the detector's electrodes.

FIG. 1*a* shows, highly schematically, the arrangement of electrodes in a prior art cell. In particular, a section through a cell 10 is shown, along with its longitudinal axis z. An orthogonal section through the cell 10 is also shown in FIGS. 1*d* and 1*e* which show, respectively, the electrode arrangements in a cylindrical and in a square rectangular configuration respectively.

In FIG. 1*a*, the cell 10 comprises a central excitation electrode 20 and outer excitation electrodes 30, 40 surrounding that. An r.f. voltage is applied to each of the excitation electrodes so as to produce an excitation field, and a d.c. voltage is applied to the outer electrodes 30, 40 so as to provide a trapping field. In an alternative arrangement to that shown in FIG. 1*a*, capacitors may be situated between the RF and DC connections.

The trapping field created by the prior art arrangement of FIG. 1*a* is shown in FIG. 1*b*.

The longitudinal ("z") axis of FIG. 1*b* is intended to be generally to the same scale as that of FIG. 1*a*, so that the magnitude of the trapping field U in the z-direction of FIG. 1*b* corresponds with the position along the z axis of the electrodes in FIG. 1*a*. FIG. 1*b* also shows the approximate range of the homogeneous field region of the applied magnetic field.

FIG. 1*c* shows a schematic representation of equipotentials of the excitation field in the cell 10 of FIG. 1*a*. It will be seen that the excitation field equipotentials are generally parallel to the z axis in the centre of the cell and close to the 'z' axis, so that there is no excitation electric field component in the z direction, but curve significantly so that there is a non-zero excitation electric field component in the z-direction (see FIG. 1*g*). Optimal excitation for FTMS requires an homogeneous electrical excitation field. R.f. electric field components in the radial direction of the cell cause the ions to gain energy in that (desired) radial direction. Any finite electrical excitation field component in the direction of the cell's longitudinal axis 'z' causes an acceleration in that axial direction. Longitudinal acceleration of ions is undesirable because the potential barrier in that direction is typically only of order 1 eV (higher trapping potentials causing unwanted field distortion) and so ions may easily escape from the cell and thus be lost.

One theoretical possibility to remove the axial r.f. field components towards the edges of the cell would be to make the electrodes of infinite length. The problem with this is that, as the electrodes become longer in the z-direction, so the ions reside in a volume that extends outside of the homogeneous zone of the magnetic field. This in turn causes a reduction in the resolving power of the spectrometer.

An alternative approach to the production of an excitation electric field with parallel field lines is described in U.S. Pat. No. 5,019,706. Here, additional electric r.f. signals are applied to one or more of the trapping electrodes on both sides of the measuring cell. This causes the inhomogeneities in the field lines at the cell extremities (as a result of its finite length in the axial direction) to be balanced out by heterodyning with the additional r.f. field components which are introduced by the trapping electrodes, so that the ions in the trap experience an r.f. field more like that which would be produced by a cell of infinite axial length. Lines of equipotential in the cell of U.S. Pat. No. 5,019,706 are shown for the purposes of illustration only, in FIG. 1*f*.

Nevertheless, the arrangement of U.S. Pat. No. 5,019,706 suffers from the disadvantage that electrodes have to share the static trapping potential and the RF excitation potentials, which may increase the cost of the driving electronics and/or the amount of noise. Furthermore, the potential well which traps ions in the cell extends as far as the region of excitation field curvature in this arrangement so that trapped ions still experience an inhomogeneous excitation field, as may be seen from FIG. 1*f*.

Against this background, there is provided, in a first aspect, a measurement cell for an FTMS spectrometer, comprising: an excitation electrode arrangement positioned about a longitudinal axis which extends in a direction generally parallel to the field direction of an applied homogeneous magnetic field; and a trapping electrode arrangement, also positioned about the said longitudinal axis, for trapping ions longitudinally in the cell within a trapping region defined by the trapping electrode arrangement; wherein at least a part of the excitation electrode arrangement extends axially outwardly of the trapping region defined by the trapping electrode arrangement.

Placing at least a part of the excitation electrode arrangement axially outwardly of the trapping region causes the non-linear region of the excitation field to be "pulled" axially outwards relative to the prior art arrangements so that the field lines are more linear in the region axially between the trapping electrodes in which the ions are confined, which defines the trapping region, and where, in preference, the magnetic field is homogeneous.

In accordance with one preferred embodiment, the excitation electrode arrangement comprises a central excitation electrode part, and outer excitation electrode parts, the outer excitation electrode parts being positioned axially outwardly of the trapping electrode arrangement. The excitation electrode parts may be linked by wires, or may alternatively be connected by relatively narrow bridge members that extend axially between a first outer excitation electrode and the central excitation electrode, and between a second outer excitation electrode and the central excitation electrode, respectively. In that case, the trapping electrode arrangement may comprise a first trapping electrode, located in an aperture defined by the axially inner edge of the first outer excitation electrode part, a first axially outer edge of the central excitation electrode part, and two circumferentially displaced axially extending narrow bridge members, and a second trapping electrode located in an aperture defined by the axially inner edge of the second outer excitation electrode part, a second axially outer edge of the central excitation electrode part, and two further circumferentially displaced, axially extending narrow bridge members.

In an alternative embodiment, the excitation electrode arrangement comprises a relatively narrow strip extending substantially the length of the cell. In that case, the trapping electrode arrangement is circumferentially displaced from the excitation electrode strip, and may be aligned with, and/or interspersed with, one or more detection electrodes. In this case, it is desirable that the excitation electrode arrangement is relatively narrow, as this avoids excessive disturbance of the trapping field, that is, maintains the trapping field's homogeneity. The term "relatively narrow" may be narrow relative to the length (in the longitudinal axis direction) of the trapping electrode arrangement, or narrow compared to the detection electrode arrangement, or both. Additionally or alternatively, the excitation electrode arrangement may be elongate, again in the longitudinal axial direction, in order to maximise the amount of the trapping region within the homogeneous excitation field provided by the excitation electrode arrangement.

In accordance with a further aspect of the present invention, there is provided method of trapping and exciting ions in a measurement cell of an FTMS spectrometer, the method comprising: (a) applying a magnetic field to the measurement cell so as to produce a region of homogeneous magnetic field, having a magnetic field direction, within the cell; (b) applying a d.c. trapping potential to a plurality of trapping electrode arrangement positioned about a longitudinal axis which extends in a direction generally parallel to that magnetic field direction, so as to trap ions in the cell, in that axial direction within a trapping region defined by the trapping electrode arrangement; and (c) applying an r.f. excitation potential to an excitation electrode arrangement positioned about that longitudinal axis, so as to resonantly excite the ions in the cell, at least a part of the excitation electrode arrangement extending axially outwardly of the trapping region defined by the trapping electrode arrangement; wherein the ions are trapped within the region of homogeneous magnetic field and wherein the ions are further trapped within a homogeneous region of an excitation electric field generated by the application of the r.f. excitation potential to the said excitation electrodes.

In still a further aspect of the present invention, there is provided a method of trapping and exciting ions in a measurement cell of an FTMS spectrometer, the method comprising: (a) applying a magnetic field to the measurement cell so as to produce a region of homogeneous magnetic field, having a magnetic field direction, within the cell; (b) applying a d.c. trapping potential to a plurality of trapping electrodes which are arranged symmetrically about a longitudinal axis which extends in a direction generally parallel to that magnetic field direction, so as to trap ions in the cell, in that axial direction; and (c) applying an r.f. excitation potential to a plurality of excitation electrodes which are arranged symmetrically about that longitudinal axis, so as to resonantly excite the ions in the cell, at least a part of the excitation electrodes being arranged axially outwardly of the trapping electrodes; wherein the ions are trapped within the region of homogeneous magnetic field and wherein the ions are further trapped within a homogeneous region of an excitation electric field generated by the application of the r.f. excitation potential to the said excitation electrodes. The invention also extends to a measurement cell for an FTMS spectrometer, comprising: a plurality of excitation electrodes arranged symmetrically about a longitudinal axis which extends in a direction generally parallel to the field direction of an applied homogeneous magnetic field; and a plurality of trapping electrodes, also arranged symmetrically about the said longitudinal axis; wherein at least some of the excitation electrodes are arranged axially outwardly of the trapping electrodes.

Further preferred features are set out in the dependent claims which are appended hereto.

The invention may be put into practice in a number of ways and some preferred embodiments will now be described by way of example only and with reference to the accompanying drawings, in which:

FIG. 1*a* shows a schematic longitudinal section through a prior art FTMS measurement cell;

FIG. 1*b* shows, to the same scale as FIG. 1*a*, the d.c. trapping potential U along the longitudinal axis z of the cell of FIG. 1*a;*

FIG. 1*c* shows, again to the same scale as FIG. 1*a*, lines of r.f. excitation equipotential τ along the longitudinal axis z of the cell of FIG. 1*a;*

FIGS. 1*d* and 1*e* show views along the line AA of FIG. 1*a*, for circular and square section cells respectively;

FIG. 1*f* shows lines of r.f. excitation potential τ along the longitudinal axis of the measurement cell of U.S. Pat. No. 5,019,706 which also forms a part of the state of the art;

FIG. 1*g* shows the electrical field components of an arbitrary point on an r.f. excitation field equipotential of the cell of FIG. 1*a*, towards the edges of that cell, along with an indication of the radial and axial components of force thereby applied to an ion at that point;

FIG. 2*a* shows a schematic longitudinal section through an FTMS measurement cell in accordance with a first embodiment of the present invention;

FIG. 2*b* shows, to the same scale as FIG. 2*a*, the d.c. trapping potential U along the longitudinal axis z of the cell of FIG. 2*a;*

FIG. 2*c* shows, also to the same scale as FIG. 2*a*, lines of equipotential for the r.f. excitation field τ along the longitudinal axis z of the cell of FIG. 2*a;*

FIG. 3*a* shows a schematic longitudinal section through an FTMS measurement cell in accordance with a second embodiment of the present invention;

FIG. 3*b* shows, to the same scale as FIG. 3*a*, lines of equipotential for the r.f. excitation field τ along the longitudinal axis of the measurement cell of FIG. 3*a;*

Figure 7A:
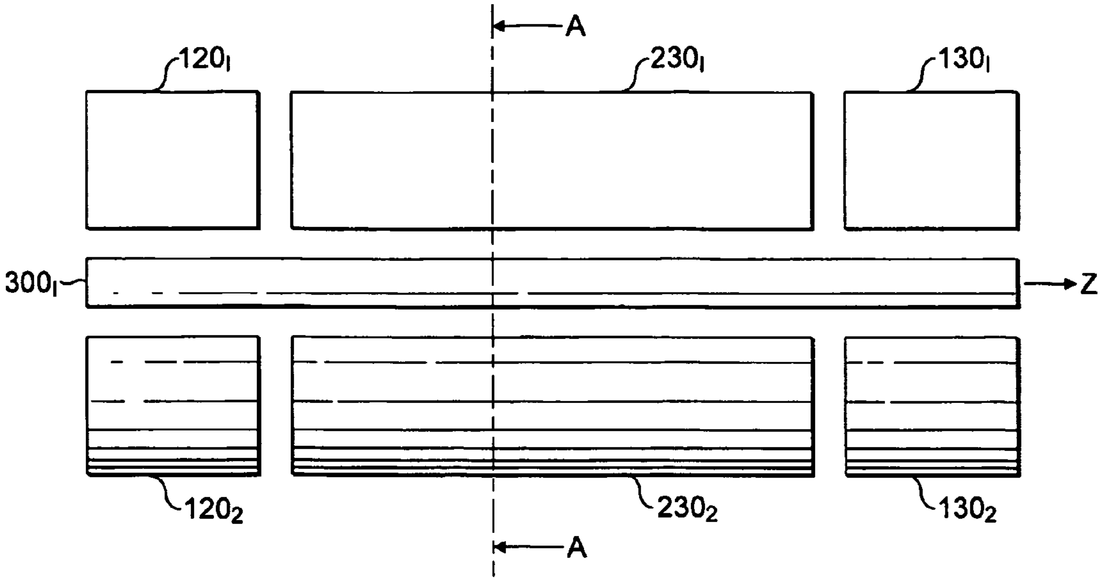
Figure 7B:
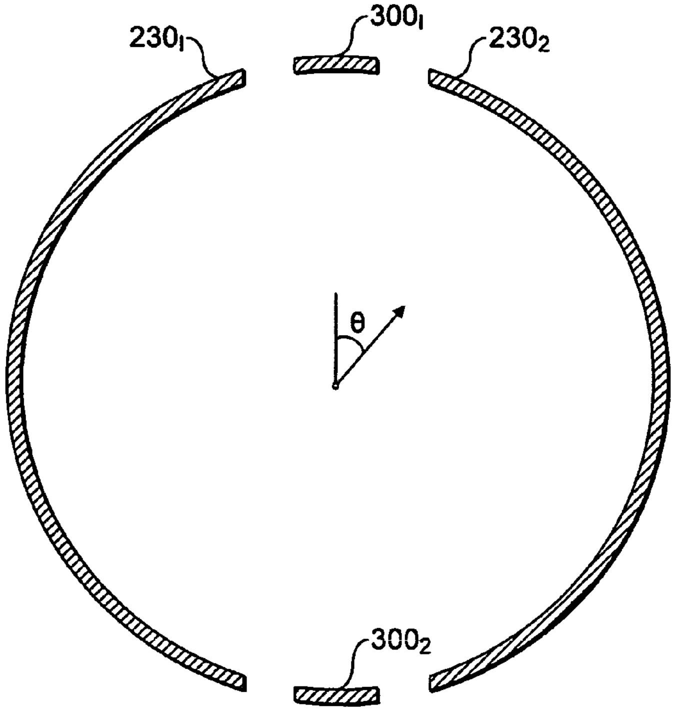

FIG. 7*a* shows a side view of another embodiment of an FTMS measurement cell according to the present invention; and FIG. 7*b* shows a section along the line AA' of FIG. 7*a*.

Figure 2A:
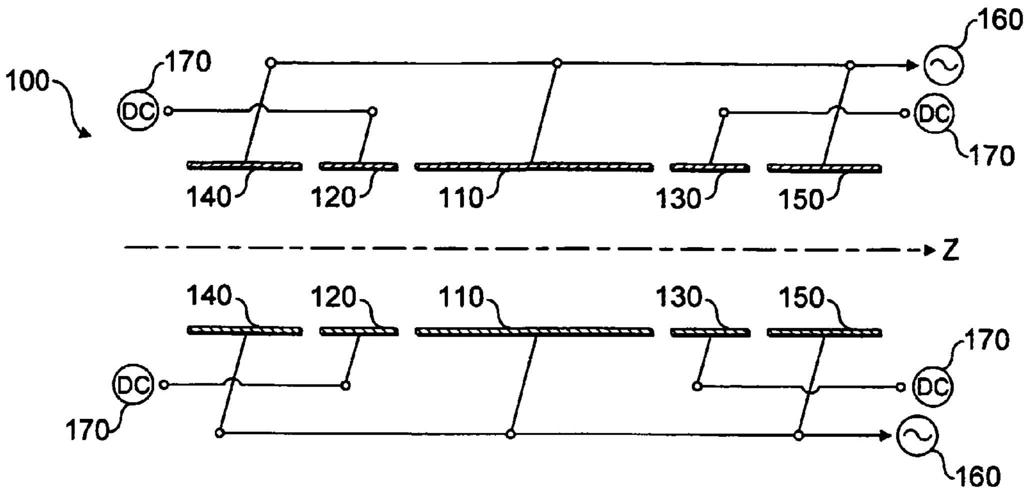

Turning first to FIG. 2*a*, a schematic longitudinal section through an FTMS measurement cell 100 in accordance with a first embodiment of the present invention is shown. The cell 100 is rotationally symmetrical about a longitudinal axis z and may, for example, be cylindrical or oblong in shape, as will be explained further below.

The cell 100 comprises a first pair of central excitation electrodes 110 which are located about an axially central point of the cell 100. Axially outward of this central pair of excitation electrodes 110, on either side thereof, are two pairs of trapping electrodes 120, 130. The trapping electrodes of FIG. 2*a* have the same, or similar, diameter, to the first pair of excitation electrodes 110.

Axially outwardly of the pairs of trapping electrodes 120, 130 are second and third pairs of outer excitation electrodes 140, 150 respectively. Again, the diameter of these outer excitation electrode pairs is the same or similar to that of the trapping and central excitation electrode pairs. Thus, the outer electrode pair 140 and the central electrode pair 110 'sandwich' the trapping electrode pair 120 between them, and the outer electrode pair 150 and central electrode pair 110 'sandwich' the trapping electrode pair 130 between them.

An r.f. voltage supply 160 is connected, in the embodiment of FIG. 2*a*, to each of the excitation electrode pairs 110, 140, 150. Although a single r.f. voltage supply (of a given voltage) may be attached to each of the excitation electrode pairs, different voltages and/or frequencies may instead be applied to each by virtue of voltage and/or frequency divider(s) respectively, or by using separate r.f. voltage supplies.

A d.c. voltage 170 is applied to the trapping electrodes 120, 130. Again, the same or different d.c. voltages may be applied to the two pairs of trapping electrodes 120, 130.

Figure 1B:
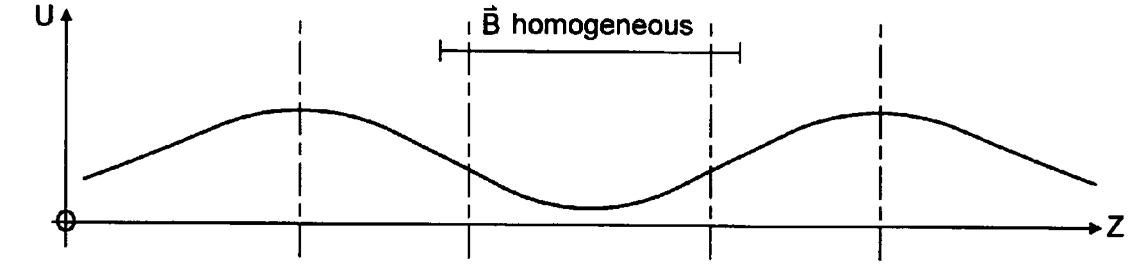
FIG. 1b Prior Art
Figure 1C:
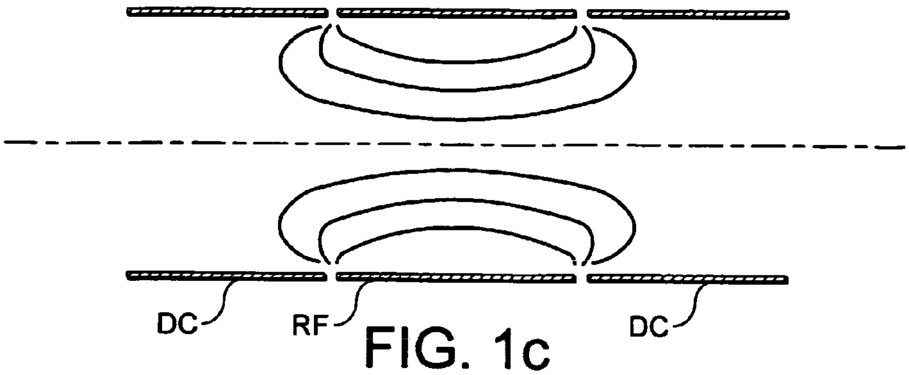
FIG. 1c Prior Art
Figure 2B:
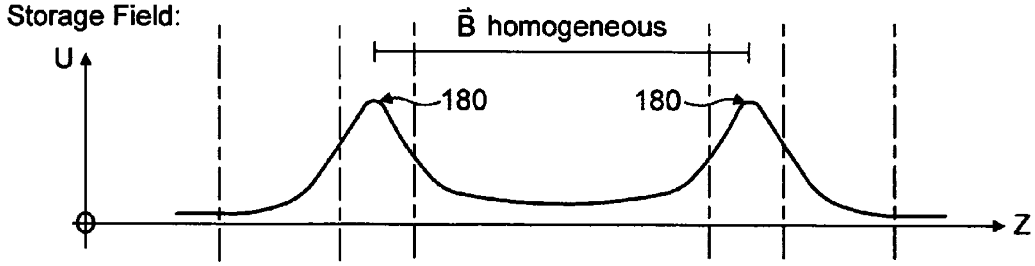

FIG. 2*b* shows a schematic plot of the trapping field, U, as a function of axial position z. It will be seen that, in comparison with the prior art arrangement of FIG. 1*b*, the trapping field has two clearly defined peaks 180 which coincide with the axial positions of the trapping electrodes 120, 130. The peaks then tail off sharply as the position z moves further away from the centre of the cell 100.

Figure 2C:
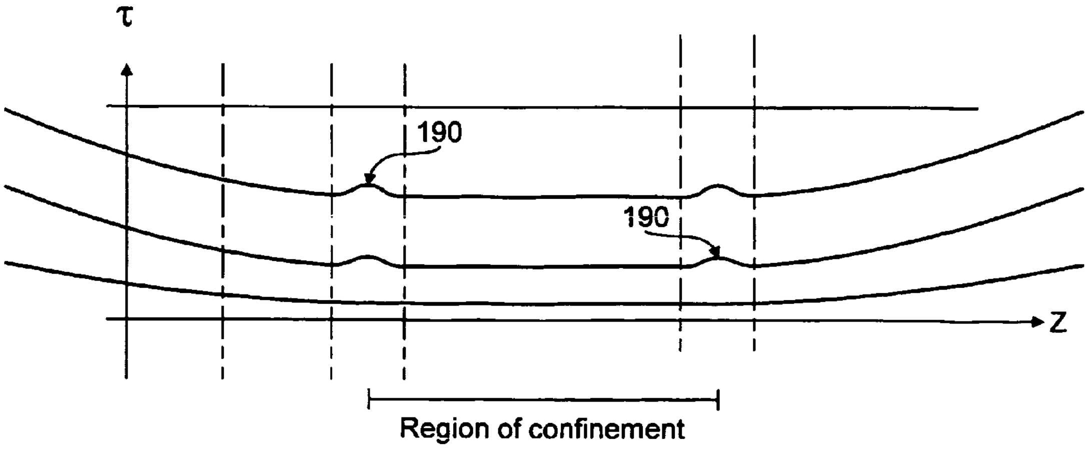

FIG. 2*c* shows a schematic of the lines of equipotential of the excitation field generated in the cell 100 of FIG. 2. It will be noted that the field lines are relatively flat and parallel with the z axis, across the bulk of the region of confinement of the ions which is between the two peaks 180 of the trapping potential U (FIG. 2*b*). There is a small perturbation 190 in the excitation field in the region of the trapping electrodes, as is seen in FIG. 2*c*, but this has not been found to affect the overall trapping and excitation unduly.

Figure 1A:
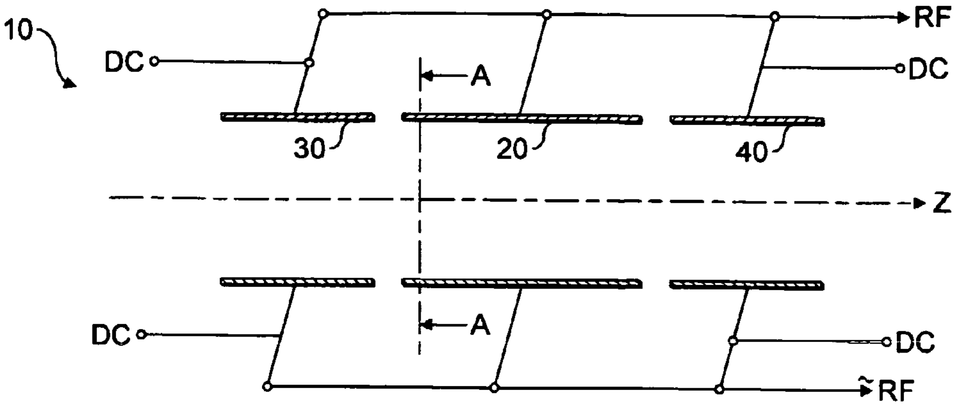
FIG. 1a Prior Art

The arrangement of FIG. 2*a* accordingly "pulls" the non-linear region of the excitation field outwards relative to the arrangement of FIG. 1*a* so that the excitation electric field is essentially homogeneous in the trapping region. It will also be noted that the axial barriers formed by the peaks 180 in the trapping field coincide with the homogeneous area of the magnetic field (cf U.S. Pat. No. 5,019,706, described above, where the (physical) axial barriers for trapped ions are in that case outside the homogeneous area of the magnetic field). Thus, high resolution FTMS measurements can be made (because a large proportion of trapped ions experience homogeneous magnetic and excitation fields) whilst the number of ions lost after injection into the cell 100 is minimized.

Figure 1D:
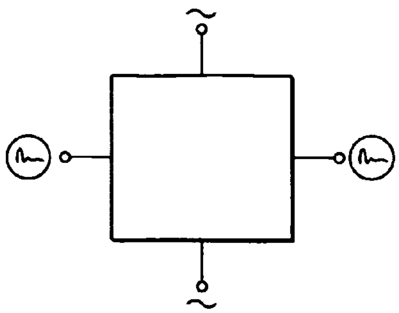
FIG. 1d Prior Art
Figure 1E:
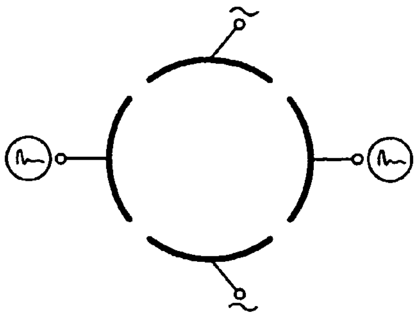
FIG. 1e Prior Art
Figure 1F:
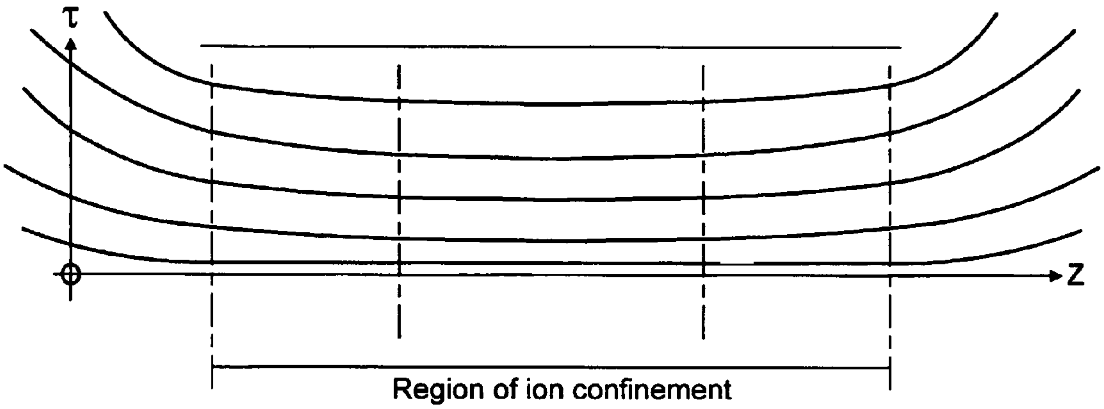
FIG. 1f Prior Art
Figure 1G:
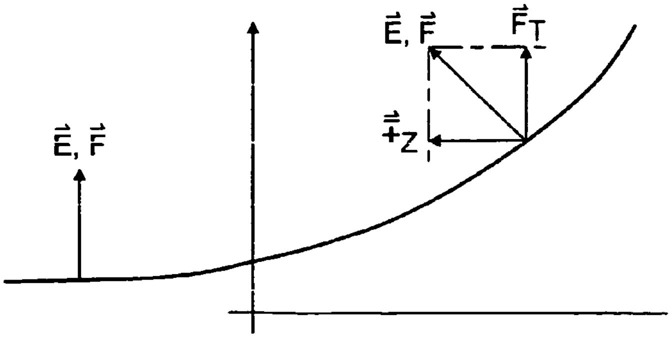
FIG. 1g Prior Art
Figure 3A:
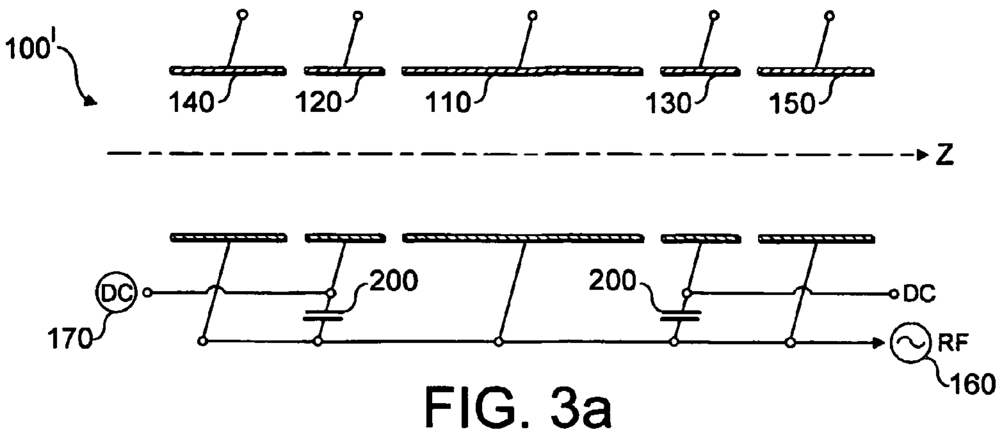
Figure 4:
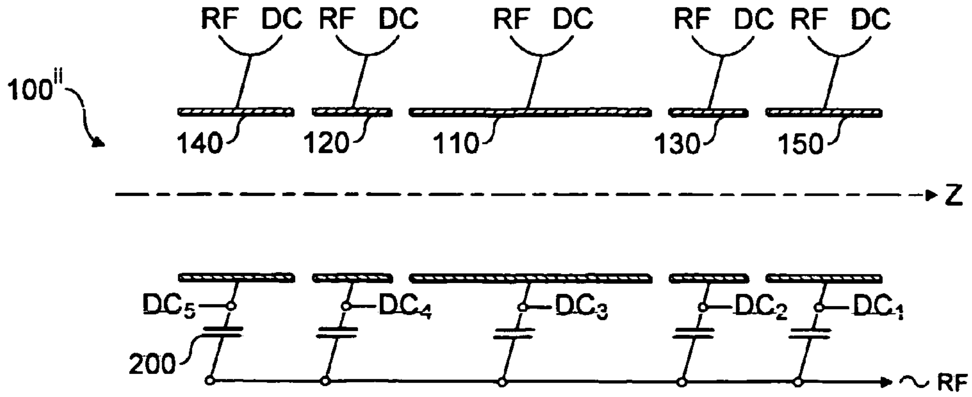
FIG. 4 shows a schematic longitudinal section through an FTMS measurement cell in accordance with a third embodiment of the present invention

Although not shown in FIG. 2*a*, 3*a* or 4, it will be understood that the cell 100 of FIG. 2 also includes detecting electrodes which may (as in the arrangements of FIG. 1*d* or 1*e*) be radially interspersed with the trapping and excitation electrodes. The detecting electrodes and the trapping/excitation electrodes may be radially equally spaced from the axis z, so as to retain symmetry. In terms of the relative dimensions, the typical arrangement has excite electrodes that each occupy approximately one quarter of the circumference of the cell (the detection electrodes occupying most of the remaining two quarters of the circumference). Other ratios are, however, possible/desirable and these will be explored below.

Figure 3B:
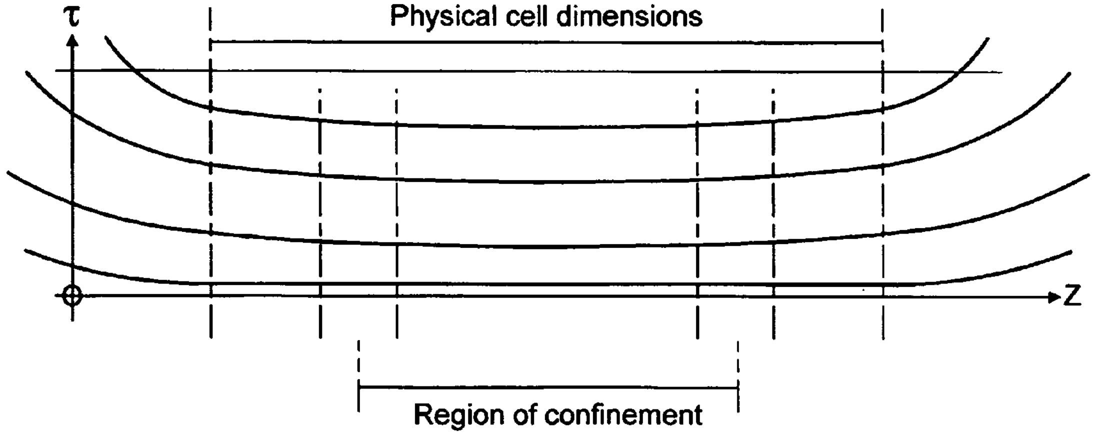

FIG. 3*a* shows an alternative arrangement of a measurement cell 100' to that of FIG. 2*a*. Features common to these two Figures are nevertheless labelled with like reference numerals. In the cell 100' of FIG. 3*a*, instead of connecting the r.f. voltage supply 160 only to the excitation electrodes 110, 140, 150, it is also connected, along with the d.c. voltage 170 to the trapping electrodes 120, 130. The logical layout of electrode potentials is shown in the upper part of FIG. 3*a*. The physical layout, indicating one way of wiring the electrodes is shown in the lower part of that Figure. It will be seen that the r.f. and d.c. voltage supplies 160, 170 are decoupled from one another by employing a capacitance 200 between the r.f. and d.c. supplies to the trapping electrodes 120, 140, so that d.c. is not also supplied via the r.f. electrical leads to the excitation electrodes 110, 140, 150. Applying a combined d.c. and r.f. field in this way reduces the presence of the perturbation 190 in the vicinity of the trapping electrodes, as may be seen from FIG. 3*b* which shows lines of equipotential in the cell 100' of FIG. 3*a*.

Turning next to FIG. 4, a further embodiment of a cell 100' for FTMS is shown. Again, the components common to FIGS. 2*a*, 3*a* and 4 are labelled with like reference numerals. In the arrangement of FIG. 4, each of the electrodes 110, 120, 130, 140 and 150 is selectively connectable to a.c. and d.c. voltages which are decoupled using capacitances 200. This allows for maximum flexibility. For example, each of the electrodes can first be energized with d.c. only, when the cell is first filled with ions. Thus, a trapping field can be established which has boundaries extending right to the edges of the cell 100". This trapping field can then be adjusted so as to squeeze the ions towards the centre of the cell 100"; in particular, the d.c. voltage can be adjusted on the electrodes so as to shift the potential well towards the centre of the cell 100" until there is no more d.c. voltage on the outer excitation electrodes 140, 150 or on the central excitation electrodes 110, and the trapping field resembles that of FIG. 2*b*. At that point, the r.f. voltage supply 160 can be applied to the excitation electrodes 110, 140, 150 to arrive at the configuration of FIG. 2*a*, or it may be applied to all of the electrodes, excitation plus trapping, to arrive at the configuration of FIG. 3*a*. Other static field configurations may be envisaged as a precursor to the preferred trapping/excitation arrangements.

Figure 5:
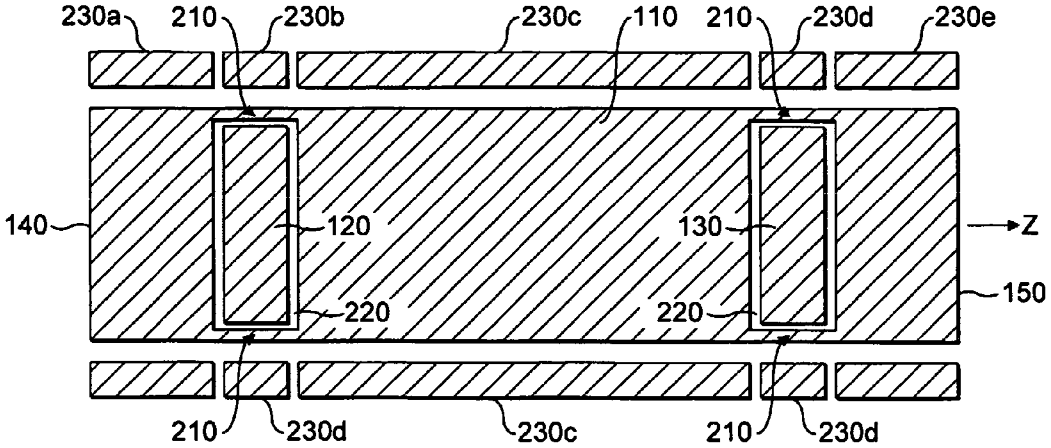
FIG. 5 shows still a further embodiment of an FTMS measurement cell in accordance with the present invention, with the trapping electrodes being formed as inserts in the extended excitation electrodes.

As may be seen in particular in FIG. 2*a*, the excitation electrodes 110, 140, 150 are linked by a common connection to the r.f. voltage supply 160, about the annular trapping electrodes 120, 130. An alternative to this arrangement is shown in FIG. 5, wherein the connections between the central excitation electrode 110 and the outer electrodes 140, 150 are formed by employing a single piece electrode with narrow bridges 210 between the central excitation electrode part 110 and the two outer electrode parts 140, 150. It will be understood that FIG. 5 shows a side view and that there is in fact a pair of the composite electrodes (formed from the central and outer parts 110, 140, 150 as linked by the bridges 210), but that only one of the pair is visible in the side view of FIG. 5.

As a consequence of the bridges 210, part of the trapping is achieved by locating trapping electrode pairs 120, 130 in apertures 220 defined by the axially outer edges of the central excitation electrode 110, the axially inner edges of the outer electrode parts 140, 150 (each in the 'z' axis direction as shown in the Figure), and the bridges 210. The field generated by the arrangement of FIG. 5 is otherwise the same as that shown in FIG. 2*c*.

As can be seen in the side view of FIG. 5, the circumferential space between the two sets of excitation electrodes 120, 140, 150 (only one of which pair is visible in FIG. 5) has further electrodes for trapping and detection. In particular, trapping electrodes 230*b*, 230*d* are aligned with the trapping electrodes 120, 130 in the longitudinal direction of the cell so as to define a trapping volume that is axially between the electrodes 230*b*, 120 and the electrodes 230*d*, 130. Detection electrodes 230*c* are located axially between the trapping electrodes 230*b*, 230*d*. In the arrangement of FIG. 5, further electrodes 230*a*, 230*e* are connected to DC (and usually, ground potential) since the ions in the measurement cell are trapped by the trapping field axially inwardly of this and so there is little benefit in trying to detect with the electrodes 230*a*, 230*e*.

Figure 6:
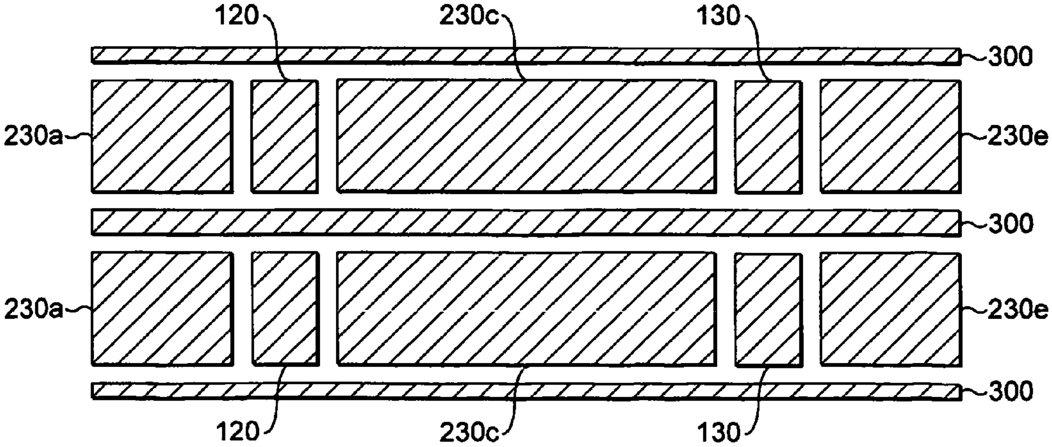
FIG. 6 shows another embodiment of an FTMS measurement cell according to the present invention, with the trapping electrodes interlaced with the detection electrodes and elongate, narrow excitation electrodes.

A further development of the arrangement of FIG. 5 is shown in FIG. 6. Here, the bridges 210 of FIG. 5 are extended along the length of the cell, but the remaining parts of the excitation electrodes are discarded to leave narrow excitation electrode strips 300. The part of the excitation electrodes 110, 140, 150 extending around the major proportion of the circumference in FIG. 5 is instead replaced in the embodiment of FIG. 6 with detection electrodes 230*c* axially bounded with trapping electrodes 120, 130. As with the arrangement of FIG. 5, there are also electrodes 230*a*, 230*e* outside of the trapping electrodes (in the longitudinal direction) but, again because the trapping region is defined between the trapping electrodes 120, 130, the outer electrodes are not usefully useable as detection electrodes and are accordingly connected to DC (usually, ground potential).

The arrangement of FIG. 6 is based upon several principles. Firstly, the trapping field becomes distorted when the share of the trapping electrodes on the circumference decreases. This in turn reduces the quality of the detect signal produced from the detection electrodes 230*c*. However it has been realized that the trapping electrodes do not need to be interlaced with the excitation electrodes, and can instead be interlaced with the detection electrodes. Secondly, it has traditionally been understood that reducing the circumferential extent of the excitation electrodes below about 25% (i.e. below about 90°) would be a problem, since the smaller the radial width (i.e. circumferential extent) of the excitation electrodes, the higher the required power. By employing power amplifiers matched to the high impedance of the measurement cell, rather than standard "off the shelf" amplifiers matched to 50Ω output as at present, the necessary power output is significantly reduced, thus enabling a reduction in excitation electrode width. For example, at 50Ω output impedance, a 100V excitation amplitude requires $V^2/Z=200$ Watts of output power. At 250Ω output impedance, only 40 Watts of power is needed. Indeed, maintaining narrow excitation electrodes in such an arrangement proves to be desirable, since this avoids significant disturbance of the trapping field. In general terms, when the trapping electrodes are interlaced with the excitation electrodes (FIGS. 2-5), it is desirable to keep the width of the excitation electrodes (i.e. the distance around the circumference of the measurement cell) below the length (in the axial or 'z' direction of the cell) of the trapping electrodes, in order to minimize the effect of the disturbance of the trapping field.

FIG. 7*a* shows a side view of a measurement cell in accordance with still a further embodiment of the present invention. FIG. 7*b* shows a sectional view through a section AA' of the cell of FIG. 7*a*. As seen best in FIG. 7*b*, the arrangement is relatively simple and contains only two pairs of electrodes. Two excitation electrodes $\mathbf{300}_1$, $\mathbf{300}_2$ extend in the z direction along the radially (direction θ in FIG. 7*b*) around only a small fraction of the 360° circumference of the cell. The excitation electrodes are thus narrow but elongate. A pair of detection electrodes $\mathbf{230}_1$, $\mathbf{230}_2$ form most of the remainder of the circumference, but do not extend along the full length of the cell. Instead the detection electrodes $\mathbf{230}_1$, and $\mathbf{230}_2$ extend along the middle part of the cell in the z direction (FIG. 7*a*) but are bounded by left and right trapping electrodes $\mathbf{120}_1$, $\mathbf{130}_1$, and $\mathbf{120}_2$, $\mathbf{130}_2$ respectively.

The wide angle occupied by the detection electrodes $\mathbf{230}_1$, $\mathbf{230}_2$ cause harmonics to arise in the detection signal obtained. These harmonics may however be removed by signal processing.

Although some specific embodiments of the invention have been described, it will be understood that these are by way of example only and that various modifications are possible. For example, whilst in FIGS. 3*a* and 4, the r.f. and d.c. voltages are decoupled using a capacitance, an inductance may be employed instead or as well. Furthermore, although only two pairs of outer excitation electrodes have been described, additional outer excitation electrodes may be employed, so as further to reduce inhomogeneities in the excitation field in the region of the homogeneous magnetic field. Indeed, interlaced trapping/excitation/trapping/excitation arrangements may also be employed.

As a further refinement, the cell 100, 100' and 100" may be fitted with end caps (not shown) that are located at either end of the cell, adjacent the outer excitation electrode pairs 140, 150 and which are mounted coaxially with the electrodes. Preferably, these end caps have a radius somewhat less than that of the excitation and trapping electrodes so that the cell is only partially physically closed by the end caps. This arrangement permits the field shape to be controlled still further.

As still a further alternative, the central excitation electrode pair 110 may have a different diameter and/or may not be coaxial with the adjacent trapping electrode pairs 120, 130 or the outer excitation electrodes 140, 150. This allows for compensation for the excitation field in the vicinity of the trapping electrodes, once again so as to remove or at least reduce the magnitude of the perturbation 190 (FIG. 2*c*).

The invention claimed is:

1. A measurement cell for an FTMS spectrometer, comprising:

an excitation electrode arrangement positioned about a longitudinal axis which extends in a direction generally parallel to the field direction of an applied homogeneous magnetic field, the excitation electrode arrangement including a central excitation electrode part and first and second outer excitation electrode parts axially spaced from the central excitation electrode part; and a trapping electrode arrangement, also positioned about the longitudinal axis, for trapping ions longitudinally in the cell within a trapping region defined by the trapping electrode arrangement, the trapping electrode arrangement including first and second trapping electrodes located axially between the central excitation electrode part and the first and second outer excitation electrode parts respectively;

wherein at least a part of the excitation electrode arrangement extends axially outwardly of the trapping region defined by the trapping electrode arrangement.

2. The measurement cell of claim 1, wherein the excitation electrode arrangement further comprises linking members extending in the longitudinal direction between the central electrode part and the first and second outer excitation electrode parts respectively so as to provide an electrically conductive path between the first and second outer excitation electrode parts and the central excitation electrode part.

3. The measurement cell of claim 2, wherein the central excitation electrode part and the first and second outer excitation electrode parts each extend circumferentially by an amount which exceeds the circumferential extent of the linking members so that the excitation electrode arrangement forms a unitary member in which the first and second outer excitation electrode parts are each linked to the central excitation electrode part by relatively narrow linking members.

4. The measurement cell of claim 3, wherein the linking members, the central excitation electrode part and the first outer excitation electrode part together define a first aperture within the excitation electrode arrangement, wherein the linking members, the central excitation electrode part and the second outer excitation electrode part together define a second aperture within the excitation electrode arrangement, and further wherein the said first and second trapping electrodes are located within the said first and second apertures in the excitation electrode arrangement respectively.

5. The measurement cell of claim 1, wherein the excitation electrode arrangement extends along substantially the whole of the longitudinal axis of the cell, wherein the trapping electrode arrangement is circumferentially displaced from the excitation electrode arrangement and extends along only a part of the longitudinal axis of the cell.

6. The measurement cell of claim 5, wherein the excitation electrode arrangement extends axially beyond the ends of the trapping electrode arrangement.

7. The measurement cell of claim 1, further comprising a detection electrode arrangement for detecting ions trapped within the trapping region.

8. The measurement cell of claim 7, in which the detection electrode arrangement comprises at least one detection electrode, the at least one detection electrode being circumferentially displaced from the excitation and trapping electrode arrangements.

9. The measurement cell of claim 7, in which the detection electrode arrangement comprises a plurality of detection electrodes each of which is generally aligned in the direction of the longitudinal axis.

10. The measurement cell of claim 5, further comprising a detection electrode arrangement for detecting ions trapped within the trapping region.

11. The measurement cell of claim 10, in which the detection electrode arrangement comprises at least one detection electrode part circumferentially displaced from the excitation electrode arrangement but generally circumferentially aligned with the trapping electrode arrangement.

12. The measurement cell of claim 11, wherein the at least one detection electrode part is positioned axially inwardly of the trapping electrode arrangement.

13. The measurement cell of claim 11, in which the detection electrode assembly comprises a plurality of detection electrode parts, and in which the trapping and detection electrode parts are arranged alternately along the longitudinal axis, with the trapping electrode parts positioned between the detection electrode parts.

14. The measurement cell of claim 5, wherein the excitation electrode arrangement extends circumferentially over less than 50% of the total circumference of the measurement cell.

15. The measurement cell of claim 14, wherein the excitation electrode arrangement extends circumferentially over less than 15% of the total circumference of the measurement cell.

16. The measurement cell of claim 14, further comprising a second excitation electrode arrangement circumferentially displaced from the excitation electrode arrangement, and a second trapping electrode arrangement circumferentially displaced from each excitation electrode arrangement and also from the trapping electrode arrangement, the excitation and trapping electrode arrangements being alternately arranged around the circumference of the cell.

17. The measurement cell of claim 1, further comprising an r.f. voltage supply connected to the excitation electrode arrangement, and a d.c. voltage supply connected to the trapping electrode arrangement.

18. The measurement cell of claim 17, wherein the r.f. voltage supply is further connected to the trapping electrode arrangement.

19. The measurement cell of claim 18, wherein the r.f. voltage supply and the d.c. voltage supply are decoupled.

20. The measurement cell of claim 19, wherein the r.f. voltage supply is capacitively and/or inductively coupled to the trapping electrode arrangement.

21. The measurement cell of claim 1, wherein the excitation electrode arrangement and the trapping electrode arrangement are each equidistantly radially spaced from the longitudinal axis of the measurement cell.

22. The measurement cell of claim 1, wherein the excitation electrode arrangement comprises a plurality of excitation electrode parts, and wherein at least one of the excitation electrode parts is radially spaced from the longitudinal axis by a distance that is different from the radial distance between the longitudinal axis and at least one other of the excitation electrode parts.

23. The measurement cell of claim 1, further comprising end caps arranged axially outwardly of the trapping and excitation electrode arrangements.

24. The measurement cell of claim 23, wherein the end caps are located along the longitudinal axis of the cell so as partially to enclose a volume therebetween.

25. The measurement cell of claim 1, wherein the excitation electrode arrangement comprises:

a first pair of curved excitation electrode parts arranged symmetrically about the longitudinal axis of the cell and about a central point along that longitudinal axis;

second and third pairs of curved excitation electrode parts each arranged symmetrically about the longitudinal axis of the cell, and equidistantly spaced along that axis about the central point thereof; and first and second pairs of curved trapping electrode parts, arranged symmetrically about the longitudinal axis, each trapping pair being arranged between the first pair of curved excitation electrode parts and the second and third pairs of curved excitation electrode parts respectively;

the cell further comprising a pair of detection electrodes radially spaced about the longitudinal axis of the cell with respect to the excitation and trapping electrode parts, and having a diameter similar to the excitation and trapping electrode parts.

26. A method of trapping and exciting ions in a measurement cell of an FTMS spectrometer, the method comprising:

(a) applying a magnetic field to the measurement cell so as to produce a region of homogeneous magnetic field, having a magnetic field direction, within the cell;

(b) applying a d.c. trapping potential to a trapping electrode arrangement positioned about a longitudinal axis which extends in a direction generally parallel to that magnetic field direction, so as to trap ions in the cell, in that axial direction within a trapping region defined by the trapping electrode arrangement, the trapping electrode arrangement including first and second trapping electrodes; and (c) applying an r.f. excitation potential to an excitation electrode arrangement positioned about that longitudinal axis, so as to resonantly excite the ions in the cell, at least a part of the excitation electrode arrangement extending axially outwardly of the trapping region defined by the trapping electrode arrangement, the excitation electrode arrangement including a central excitation electrode part and first and second outer excitation electrode parts axially spaced from the central excitation electrode part, each of the trapping electrodes being interposed between the central excitation electrode part and a corresponding outer excitation electrode part;

wherein the ions are trapped within the region of homogeneous magnetic field and wherein the ions are further trapped within a homogeneous region of an excitation electric field generated by the application of the r.f. excitation potential to the said excitation electrodes.

27. The method of claim 26, further comprising:

applying an r.f. excitation potential to the trapping electrode arrangement in addition to the d.c. trapping potential applied thereto.

28. The method of claim 27, wherein the step of applying the r.f. excitation potential to the trapping electrode arrangement comprises coupling the r.f. excitation potential to the trapping electrode arrangement via a capacitance and/or an inductance.

29. The method of claim 26, further comprising, prior to at least one of the steps (a), (b) and (c):

applying a d.c. trapping potential to the excitation electrode arrangement so as to generate a first ion trapping field; and subsequently removing the d.c. trapping potential from the excitation electrode arrangement to which it has been applied.

30. A Fourier Transform mass spectrometer, comprising:

an ion source for generating ions; and at least one ion guide for transporting the ions to a measurement cell, the measurement cell including:

an excitation electrode arrangement positioned about a longitudinal axis which extends in a direction generally parallel to the field direction of an applied homogeneous magnetic field, the excitation electrode arrangement including a central excitation electrode part and first and second outer excitation electrode parts axially spaced from the central excitation electrode part;

a trapping electrode arrangement, also positioned about the longitudinal axis, for trapping ions longitudinally in the cell within a trapping region defined by the trapping electrode arrangement, the trapping electrode arrangement including first and second trapping electrodes located axially between the central excitation electrode part and the first and second outer excitation electrode parts respectively; and a detection electrode arrangement for detecting ions trapped within the trapping region;

wherein at least a part of the excitation electrode arrangement extends axially outwardly of the trapping region defined by the trapping electrode arrangement.

31. The measurement cell of claim 1, wherein the central excitation electrode part and at least one of the first and second outer electrode parts are formed as different regions of an integrated excitation electrode that extends along the measurement cell.

32. The measurement cell of claim 1, wherein the central excitation electrode part and at least one of the first and second outer electrode parts are formed as physically separate electrodes.

33. The Fourier Transform mass spectrometer of claim 30, wherein the central excitation electrode part and at least one of the first and second outer electrode parts are formed as different regions of an integrated excitation electrode that extends along the measurement cell.

34. The Fourier Transform mass spectrometer of claim 30, wherein the central excitation electrode part and at least one of the first and second outer electrode parts are formed as physically separate electrodes.

* * * * *